(12) United States Patent
Ilkawa et al.

(10) Patent No.: US 6,476,872 B1
(45) Date of Patent: Nov. 5, 2002

(54) SCANNING LINE CONVERTING APPARATUS

(75) Inventors: Kei Ilkawa, Tokyo (JP); Manabu Suzuki, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 08/847,749

(22) Filed: Apr. 22, 1997

(30) Foreign Application Priority Data

Apr. 26, 1996 (JP) .............................................. 8-107737

(51) Int. Cl.$^7$ ................................................. H04N 5/46
(52) U.S. Cl. ......................... 348/558; 348/556; 348/564
(58) Field of Search ................................. 348/556, 558, 348/445, 458, 569, 465, 468, 564

(56) References Cited

U.S. PATENT DOCUMENTS 5,343,238 A * 8/1994 Takata et al. ................ 348/556
5,402,177 A * 3/1995 Maeshima et al. ........... 348/476

FOREIGN PATENT DOCUMENTS

JP 3003579 * 5/1989 ............ H04N/5/46

* cited by examiner

*Primary Examiner*—Victor R. Kostak
(74) *Attorney, Agent, or Firm*—Frommer Lawrence & Haug LLP; William S. Frommer; Gordon Kessler

(57) ABSTRACT

A scanning line converting apparatus for converting the number of scanning lines of an output video signal into an arbitrary under of the scanning lines to form an output image signal. The scanning line converting apparatus includes a discriminator for discriminating an aspect ratio of a picture formed in accordance with a format of the input video signal and a display for displaying the discriminated aspect ratio. Since the discriminator discriminates the aspect ratio of the picture indicated by the input image signal and the display displays the discriminated aspect ratio, it is possible to adjust the monitor to display a picture of a proper aspect ratio based on the displayed aspect ratio.

4 Claims, 2 Drawing Sheets

FIG. 2A
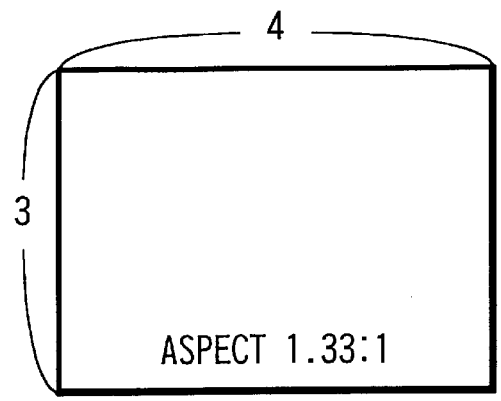
FIG. 2B
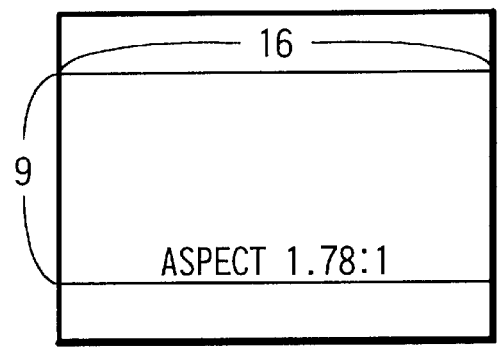
FIG. 3
| IN | NTSC | PAL | 31.5 | 37 | 48 | 64 | OTHERS |
|---|---|---|---|---|---|---|---|
| OUT | NTSC | PAL | 31.5 | 37 | 48 | 64 | |

SCANNING LINE CONVERTING APPARATUS

BACKGROUND OF THE INVENTION

1. Field of the Invention

The present invention relates to a scanning line converting apparatus suitable for use in a case, for example, when a video-signal from a computer is displayed by an optional monitor or recorded in a video cassette recorder (VCR) and the like, or a reproduced video signal is displayed by an optional monitor.

2. Description of the Related Art

For example, when the video signal from the computer is displayed by an optional monitor or recorded in the VCR and the like, the number of the scanning lines of the video signal from the computer or the like must be converted into another one in accordance with a signal format set in the monitor or the VCR. Therefore, a large number of scanning line converting apparatus have been put into practice.

However, when such scanning line converting apparatus is used to convert the number of scanning lines or the like, if the signal formats of, for example, the computer and the monitor are different from each other, aspect ratios (a ratio of a frame width to a frame length) of active pictures displayed on picture screens thereof may be different from each other. If the picture based on one signal format is displayed by a display device employing another signal format as it is, then the picture is distorted. In other words, since, when the scanning line converting apparatus is used, an optional monitor may be employed. Therefore, the distortion of the picture resulting from the difference of the aspect ratio becomes a bar to properly adjust a display device such as a monitor or the like. Some of the scanning line converting apparatus have a function to freely adjust an aspect ratio of an output signal therefrom. In this case, it is disadvantageously impossible to determine whether or not a picture indicated by the output signal has a proper aspect ratio.

SUMMARY OF THE INVENTION

In view such aspect, it is an object of the present invention to provide a scanning line converting apparatus which, even if an aspect ratio set for the monitor is different from that of an input signal, can prevent a picture from being distorted.

According to an aspect of the present invention, a scanning line converting apparatus according to the present invention is one for converting the number of scanning lines of an input video signal into an arbitrary number of the scanning lines thereof to form an output image signal, and includes a discriminating means for discriminating an aspect ratio of a picture formed in accordance with a format of the input video signal and a display means for displaying the discriminated aspect ratio.

Since the discriminating means discriminates the aspect ratio of the picture indicated by the input image signal and the display means displays the discriminated aspect ratio by a numerical value, it is possible to adjust the monitor to display a picture of a proper aspect ratio based on the numerical value of the displayed aspect ratio.

BRIEF DESCRIPTION OF THE DRAWINGS

FIGS. 2A and 2B are diagrams used to explain operations of the scanning line converting apparatus shown in FIG. 1; and FIG. 3 is a diagram showing an arrangement of an operation panel for the scanning line converting apparatus.

DESCRIPTION OF THE PREFERRED EMBODIMENT

Figure 1:
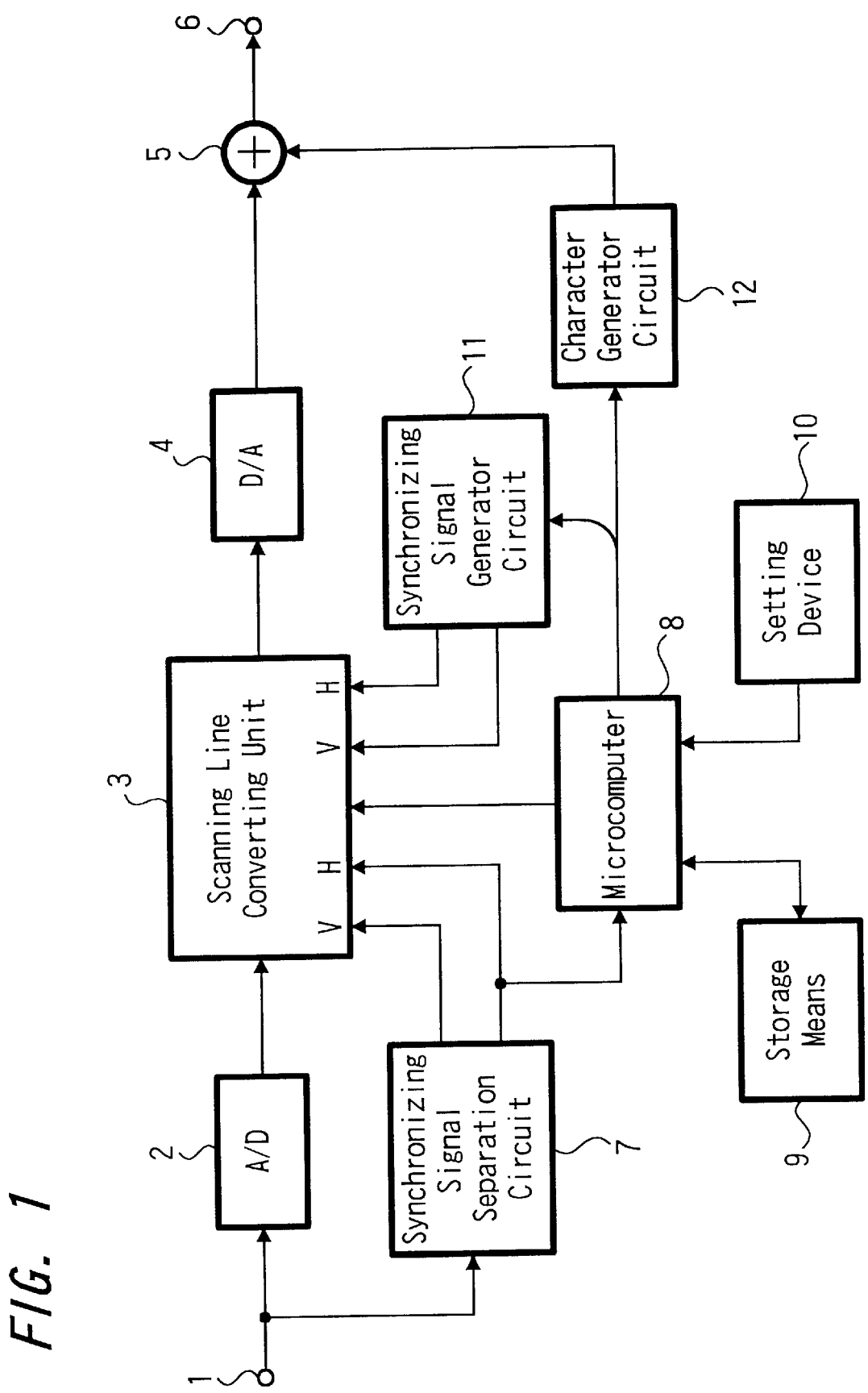
FIG. 1 is a diagram showing an arrangement of a scanning line converting apparatus according to the present invention.

A scanning line converting apparatus according to an embodiment of the present invention is one for converting the number of the scanning lines of an input video signal into an optional number of scanning lines to form an output video signal. The scanning line converting apparatus includes a discrimination means for discriminating, based on properties of the input video signal, an aspect ratio of a picture to be formed and a display means for displaying the discriminated aspect ratio thereon.

The scanning line converting apparatus according to the embodiment of the present invention will be described below with reference to the accompanying drawings. FIG. 1 is a block diagram showing an arrangement of the scanning line converting apparatus according the embodiment of the present invention, by way of example. As shown in FIG. 1, a video signal is supplied through an input terminal 1 to an A/D converter circuit 2. The A/D converter circuit 2 converts the supplied video signal into a digital signal and then supplies the digital signal to a scanning line converting unit 3. The scanning line converting unit 3 stores the supplied digital signal therein.

This scanning line converting unit 3 carries out processings such as a process of changing arbitrarily the number of the scanning lines forming a picture, for example, and so on. Then, the digital signal having scanning lines of a changed number, for example, is derived from the scanning lines converting unit 3. The derived digital signal is supplied to a D/A converter circuit 4. The D/A converter circuit 4 converts the supplied digital signal into an analog signal and then supplies the analog signal through a mixer circuit 5 for a display signal, which will be described later on, to an output terminal 6.

At the same time, the video signal is supplied through the input terminal 1 to a synchronizing signal separation circuit 7. The synchronizing signal separation circuit 7 supplies separated horizontal and vertical synchronizing signals H and V to the scanning line converting unit 3 which subjects the horizontal and vertical synchronizing signals H and V to the above processing. The synchronizing signal separation circuit 7 supplies the horizontal synchronizing signal H to a microcomputer 8. The microcomputer 8 discriminates, for example, a horizontal frequency of the input video signal. The microcomputer 8 compares the information such as the discriminated frequency or the like with data of a system data stored in a storage means 9 such as a memory or the like, thereby discriminating a signal format of the video signal supplied to the input terminal 1.

An aspect ratio of a picture indicated by a video signal having scanning lines of a changed number which a user wants is input from a setting unit 10 to the microcomputer 8. The microcomputer 8 calculates a conversion ratio or the like used in the scanning line converting unit 3 from the above discriminated signal format of the input video signal and a signal format of the output signal set by using the setting device 10. Based on the calculated conversion ratio or the like, the conversion is carried out. The microcomputer 8 supplies a control signal indicative of the set signal format of an output signal to a synchronizing signal generator circuit 11. The synchronizing signal generator circuit 11 generates horizontal and vertical synchronizing signals H and V and supplies them to the scanning line converting unit 3.

In this scanning line converting apparatus, the microcomputer 8 discriminates the aspect ratio inherent in the input signal from the above discriminated signal format and supplies an information of this aspect ratio to a character generator circuit 12. Based on the supplied information, this character generator circuit 12 generates a signal indicative of a display picture indicating the above aspect ratio inherent the input signal by using characters. The character generator circuit 12 supplies this signal indicative of a display picture to the mixer circuit 5. The mixer 5 circuit superimpose the signal on the analog video signal supplied from the D/A converter circuit 4.

Specifically, if the aspect ratio of the picture obtained from the input video signal is 1.33:1 (4:3), then, as shown in FIG. 2A, a picture indicative of characters "ASPECT 1.33:1" is displayed while being superimposed on the picture obtained from the video signal. Also, if the aspect ratio of the picture obtained from the input video signal is 1.78:1 (16:9), a picture indicative of characters "ASPECT 1.78:1" is displayed while being superimposed on the picture obtained from the video signal as shown in FIG. 2B.

Thus, according to the scanning line converting apparatus shown in FIG. 1, since the aspect ratio of the picture obtained from the input video signal is discriminated and the discriminated aspect ratio is displayed on a display device, it is possible to adjust properly the display device such as a monitor or the like so as to properly display a picture having an aspect ratio and obtained from the input video signal in accordance with the displayed aspect ratio.

When the scanning line converting apparatus according to the related art is employed, a different aspect ratio set in the monitor may disadvantageously lead to the distortion of the displayed picture. However, according to the present invention, it is possible to adjust a proper aspect ratio set in the monitor in accordance with the displayed aspect ratio.

While other than the above aspect ratios of 1.33:1 (4:3) and 1.78:1 (16:9), there are various aspect ratios such as 1;1, 5;4 or the like of a picture obtained from an input signal depending upon a signal format, it is possible to discriminate each of the above aspect ratios based on a horizontal frequency of an input video signal, for example. Therefore, if the frequency information or the like is compared with the data of the signal format stored in the storage means 9 or the like as described above, it is possible to discriminate the signal format of the input video signal and the aspect ratio of the picture indicated by the input video signal.

Moreover, in the scanning line converting apparatus according to the present invention, it is possible to improve operability of the apparatus by displaying the discriminated signal format of an input video signal, for example, on an operation panel on the picture screen of the monitor. Specifically, as shown in FIG. 3, the discriminated signal formats of an input video signal are displayed as a menu in an upper row of the operation panel. When the input video signal is an NTSC video signal having a standard signal format, for example, a portion "NTSC" is displayed with luminance or hue different from that of any other portion. Thus, a user can understand that the input video signal is the NTSC video signal. Then, a user selects a desired signal format of the output video signal from signal formats displayed in a lower row. In accordance with a user's selection, the signal format of the input video signal can be converted into the desired signal format. In this case, a representation "31.5" indicates that the horizontal scanning frequency is 31.5 kHz.

In the scanning line converting apparatus of the present invention, when the picture having an aspect ratio of 16:9 is converted into of 4:3 by a so-called squeezing processing, it is also possible to properly adjust a aspect ratio set in the monitor by displaying the aspect ratio of the input video signal as 1.78:1 (16:9).

As described above, according to the scanning line converting apparatus of the present invention, since the scanning line converting apparatus for subjecting the input video signal to scanning-line conversion by converting the number of the scanning lines of the picture indicated by the input video signal into the arbitrary number of the scanning lines thereof includes the discriminating means for discriminating the aspect ratio of the picture formed in accordance with the signal format of the input video signal and the display means for the displaying the discriminated aspect ratio, it is possible to adjust the monitor to display a picture of a proper aspect ratio in accordance with the displayed aspect ratio.

According to the present invention, since the aspect ratio of the picture indicated by the input image signal is discriminated and the discriminated aspect ratio is displayed by the display means, it is possible to adjust the monitor to display a picture of a proper aspect ratio based on the displayed aspect ratio.

Therefore, while, when the scanning line converting apparatus according to the related art is used, a different aspect ratio set in the monitor may disadvantageously lead to the distortion of the displayed picture, the present invention makes it possible to adjust the monitor to display the picture of the proper aspect ratio based on the displayed aspect ratio.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. An aspect ratio display system for displaying an aspect ratio in accordance with a scanning line converting apparatus for converting the number of scanning lines of an input video signal into an arbitrary number of the scanning lines thereof to form an output image signal, comprising:

a discriminating means for discriminating an aspect ratio of a picture formed in accordance with a format of said input video signal;

an operation panel for displaying a type of said discriminated input video signal;

a setting means for setting a signal format of said output image signal;

a control means for controlling said scanning line converting apparatus in accordance with said format of said input signal and said signal format of said output image signal; and a display means for displaying the discriminated aspect ratio in conjunction with said output image.

2. The aspect ratio display system according to claim 1, wherein the display means for displaying the discriminated aspect ratio displays information of the discriminated aspect ratio in the form of characters and numerals with superimposing it on the output image signal.

3. The aspect ratio display system according to claim 2, wherein in said representation of the aspect ratio, the aspect ratio is displayed by using numerals in the form of N:1 (where N is a positive number exceeding 1).

4. The aspect ratio display system according to claim 2, wherein in said representation of the aspect ratio, the aspect ratio is displayed by using numerals in the form of L:M (where L and M are positive integers exceeding 1).

* * * * *